J. C. McCALL.
TIRE SHOE.
APPLICATION FILED FEB. 27, 1915.
1,147,523.
Patented July 20, 1915.
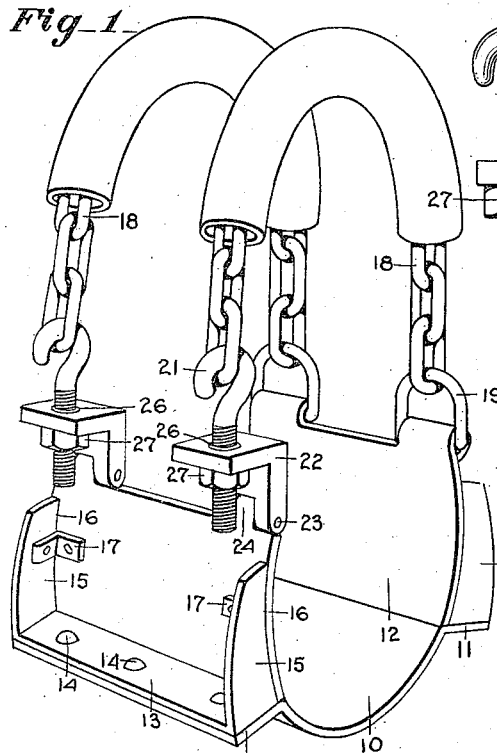
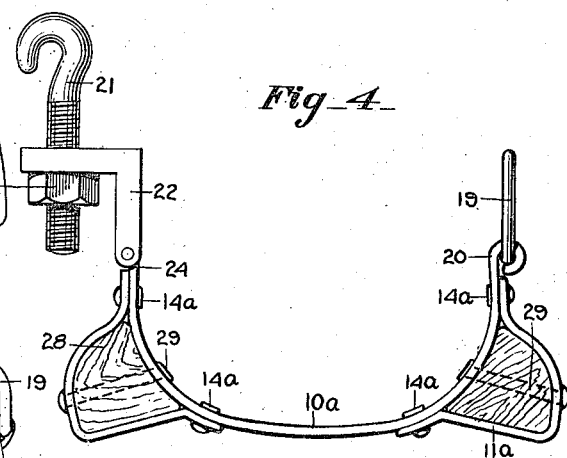
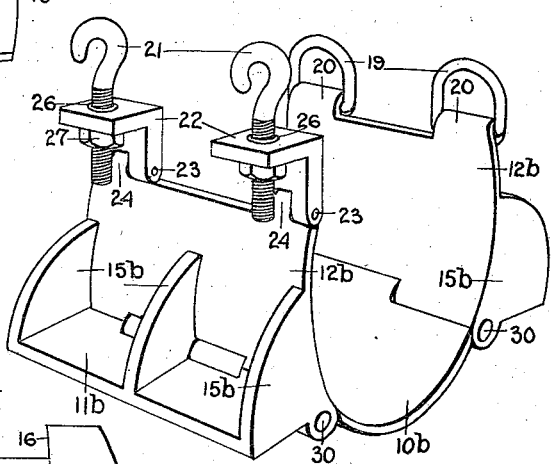
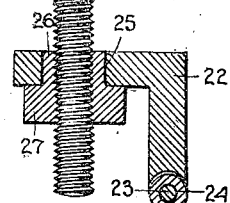
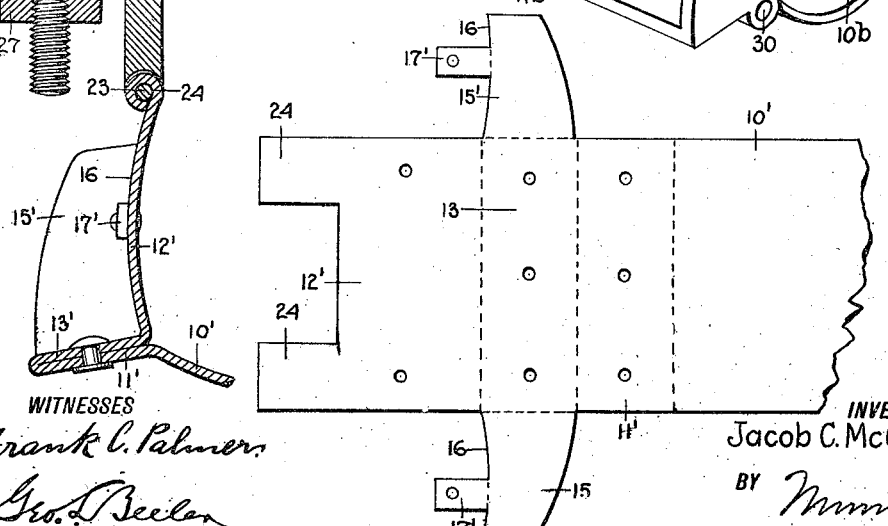
WITNESSES
Frank C. Palmer
Geo. L. Beeler
INVENTOR
Jacob C. McCall
BY
ATTORNEYS

UNITED STATES PATENT OFFICE.

JACOB CAPSHAW McCALL, OF FORT WORTH, TEXAS.

TIRE-SHOE.

1,147,523.

Specification of Letters Patent. Patented July 20, 1915.

Application filed February 27, 1915. Serial No. 10,971.

*To all whom it may concern:*

Be it known that I, JACOB C. MCCALL, a citizen of the United States, and a resident of Fort Worth, in the county of Tarrant and State of Texas, have invented a new and Improved Tire-Shoe, of which the following is a full, clear, and exact description.

This invention relates to pneumatic tires for automobiles or the like, and has particular reference to means to prevent the slipping of pneumatic tired wheels in snow, ice, mud, sand or the like.

Among the objects of the invention is to provide a device adapted to be easily applied to a pneumatic tired wheel, in sufficient quantities or number, to make a covering for as much of the periphery of the tire as may be required in any particular case.

Another object of the invention is to provide a tire shoe which may be employed, in the event of a blowout or puncture, to protect and temporarily heal the damaged tire.

A still further object of the invention is to simplify the manufacture and generally improve the class of devices referred to herein with a view of increasing the efficiency thereof and cheapening the cost.

The foregoing and other objects of the invention will hereinafter be more fully described and claimed and illustrated in the drawings forming a part of this specification in which like characters of reference indicate corresponding parts in all the views, and in which—

Figure 1 is a perspective view of one form of the invention complete and substantially in the form assumed thereby when secured to a wheel; Fig. 2 is a vertical sectional view of a modification; Fig. 3 is a plan view of one end of the blank of sheet metal used in making that form of the shoe shown in Fig. 2; Fig. 4 is a front elevation of another modification, the tread portion of the shoe being made principally of sheet metal as in the previous modification; and Fig. 5 is a perspective view of a form made principally of cast metal.

The several parts of this device may be made of any suitable materials, and the relative sizes and proportions, as well as the general design of the mechanism, may be varied to a considerable extent without departing from the spirit of the invention hereinafter more fully described and claimed.

Referring more particularly to the drawings, I show in Fig. 1 the main portion or tread part of a shoe made of sheet metal and comprising a plate 10 preferably curved to conform to the transverse curvature of the tire, and, if desired, said plate may be curved circumferentially. Said plate is shown provided with laterally extending flanges or wings 11 to which are connected upwardly extending side plates 12 each having a flange 13 for direct connection with one of the flanges 11 through rivets 14 or equivalent fastening devices. Each side plate furthermore includes an angularly disposed fin 15 at each end, the fins being bent upwardly from the ends of the flange 13 and coming within the ends of the flange 11. In other words, the flange 13 between the fins 15 is of a length equal to the length of the flange 11 less the thickness of the two fins. The inner edges 16 of the fins are concave and conform to the outer surface of the adjacent side plate 12 against which they bear and are secured by any suitable means such as brackets 17. As shown in Fig. 1, the brackets may be separate parts riveted or otherwise secured to the said plate and fins. The shoe, as thus far described, is exceedingly strong and stiff and yet is of minimum bulk or weight and adds very little to the radius of the wheel. It will be observed, therefore, that a wheel equipped with this device will roll easily upon a smooth, hard pavement without damage to the pavement or causing undue vibration to the machine.

Any suitable means may be provided to clamp the improved shoe to the wheel. The means I prefer to use for this purpose includes a pair of chains 18 or the like, each permanently connected in a ring 19 connected in a loop 20 of one side plate and adapted to have any link at the opposite end connected with a hook bolt 21, the threaded portion of which extends downwardly through an angular hanger 22 pivoted at 23 to a loop or lug 24 of the opposite side plate. Said hanger 22 is provided with a smooth hole 25 formed vertically through the outwardly extending portion of the bracket or hanger in which is rotatably fitted the hub 26 of a nut 27 having threaded engagement with said hook. Any suitable number of chains and fastening devices therefor may be used in connection with each shoe, depending upon the length thereof. Since a considerable range of adjustability in the attachment member 18 is necessary, it is essential or at least desirable that the shank of each hook 21 be of considerable length and movable therefore through the hanger 22 without danger of damaging the thread formed thereon. That form of nut coöperating, as shown, in a smooth hole in the hanger, thoroughly protects the hook threads from damage without adding materially to the friction between the nut and the hanger. It will be appreciated that in attaching the shoe to the wheel, the nuts 27 will be loosened or run down well toward the ends of the shanks, and then the chains are hooked upon the hooks as tightly as may be convenient for the operator by hand, and then, upon the application of a wrench to the nuts, the hubs 26 thereof extending into the holes 25, the hooks will be drawn downwardly far enough for the purpose of tightening the flexible connections.

The laterally extending flanges or wings formed by the parts 11 and 13 give a broad tread to the device, resisting the tendency for the wheel to plunge deeply into mud, sand, snow, etc., and the fins 15 serve both as braces between the wings and the side plates and as traction devices tending to resist the spinning of the wheel with respect to the roadbed.

If preferred, the entire shoe corresponding to Fig. 1 may be made of a single piece of sheet metal stamped as indicated in Fig. 3 and bent and secured as shown in Fig. 2. The parts corresponding to those already described are indicated as a bottom plate 10', wing flange 11', side plate 12', side plate flange 13', fins 15' and brackets 17'. With these parts formed as indicated and folded or bent upon one another along the dotted lines of Fig. 3, the parts assume substantially the same relative positions and serve the same functions as indicated and fully described in connection with Fig. 1.

In Fig. 4 I show a tread plate $10^a$ which, in effect, combines the functions of the plate 10 and side plates 12 above described. In other words, the plate $10^a$ extends upwardly from the tread terminating in attachment lugs 20 and 24 for the accommodation of the ring 19 and hanger 22 as in the previous cases. I provide, however, for the laterally projecting wings and the equivalent of the fins, a pair of longitudinally arranged loops $11^a$ riveted or otherwise secured to the plate $10^a$ as shown at $14^a$. In each of these loops is a filler which may comprise a block of wood 28 fitted in the loop and locked therein by any suitable means as, for instance, by a pin 29 extending through the loop and through the plate $10^a$.

In Fig. 5 the bottom plate $10^b$ and the side plates $12^b$ are indicated as made of cast metal and shaped to approximate the form of the pneumatic tire, but being of rigid material the side plates are hinged to the side edges of the bottom plate on pivots 30, permitting the side plates to move laterally so as to substantially snugly fit the sides of the tire to which the device is connected preferably by the means already set forth. Each side plate has cast with it a rigid, laterally projecting wing portion $11^b$ and a plurality of bracing fins $15^b$, the wings $11^b$ and fins $15^b$ serving substantially the same functions in all forms of the invention. In the forms shown in Figs. 1 to 4 inclusive, the bottom plate is sufficiently flexible to enable the shoe as a whole to be applied snugly to the convex surface of the tire by the mere application of the shoe to the wheel, the two side plates being movable toward or from each other through the flexibility of the bottom plate to make the device conform to the size and shape of the tire.

I claim:

1. In a tire shoe, the combination of a bottom plate, a pair of side plates connected to the sides of the bottom plate and movable toward and from each other, wing flanges projecting outwardly from the edges of the bottom plate, a plurality of bracing fins extending between the wing flanges and the ends of the side plates making the wing flanges rigid with respect to the side plates, and flexible connections extending from one side plate to the other for securing the device to a wheel.

2. In a device of the character set forth, the combination of a tread member comprising a bottom plate, a pair of side plates connected thereto, and bracing fins to stiffen the side plates, said side plates having formed at their upper edges attachment lugs, and attachment means for the device including a chain connected at one end to one of said lugs, an angular hanger pivoted to an opposite lug and having a vertically disposed smooth hole therein, a hook having a threaded shank extending through said hole, and a nut coöperating with said shank and having a hub journaled freely in said hole, substantially as set forth.

3. In a device of the character set forth, the combination of a bottom plate, side plates secured thereto and forming therewith laterally projecting wing flanges, a plurality of transversely disposed fins extending between the wing flanges and the ends of the side plates exterior thereto to stiffen the side plates, the foregoing parts being formed of sheet metal, said side wings being formed with attachment lugs at their upper edges, and flexible attachment means extending between the lugs of one side plate and the lugs of the other side plate whereby the bottom and side plates are caused to conform to the size and shape of the tire around which the device is secured, substantially as set forth.

In testimony whereof I have signed my name to this specification in the presence of two subscribing witnesses.

JACOB CAPSHAW McCALL.

Witnesses:
 JNO. CHAMP,
 R. A. PINKORD.